United States Patent [19]

Zuch

[11] 4,398,111
[45] Aug. 9, 1983

[54] EDDY CURRENT BRAKE

[75] Inventor: Howard W. Zuch, Sugarland, Tex.

[73] Assignee: Baylor Company, Sugarland, Tex.

[21] Appl. No.: 357,096

[22] Filed: Mar. 11, 1982

[51] Int. Cl.³ .......................................... H02K 49/02
[52] U.S. Cl. .................................... 310/93; 310/105; 310/268
[58] Field of Search ................. 310/93, 105, 268, 257

[56] References Cited

U.S. PATENT DOCUMENTS 3,031,592 4/1962 Griffiths et al. ...................... 310/93
3,486,051 12/1969 Hanson .......................... 310/268 X Primary Examiner—Donovan F. Duggan
Attorney, Agent, or Firm—Shlesinger, Arkwright, Garvey & Fado

[57] ABSTRACT

An eddy current machine has a disc-type rotor mounted on a transversely disposed shaft and circularly arranged sets of adjacent poles of different polarity. A uniform flux path is provided for the magnetic lines of flux. The air gap between the pole faces and the rotor can be adjusted. Cooling fluid circulates around both rotor and pole faces.

13 Claims, 8 Drawing Figures

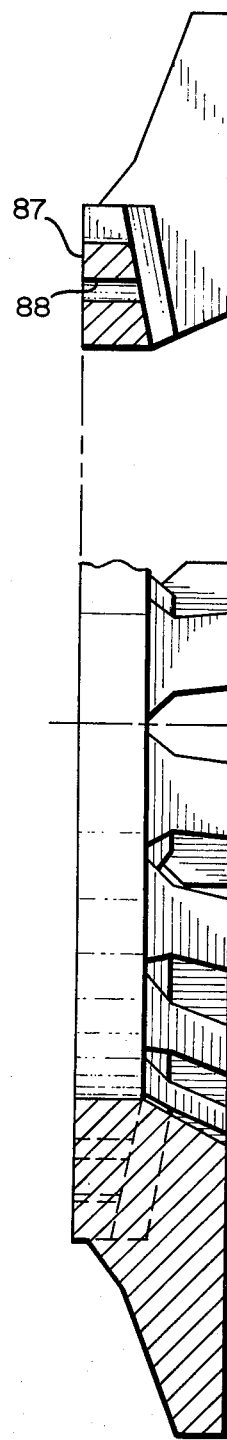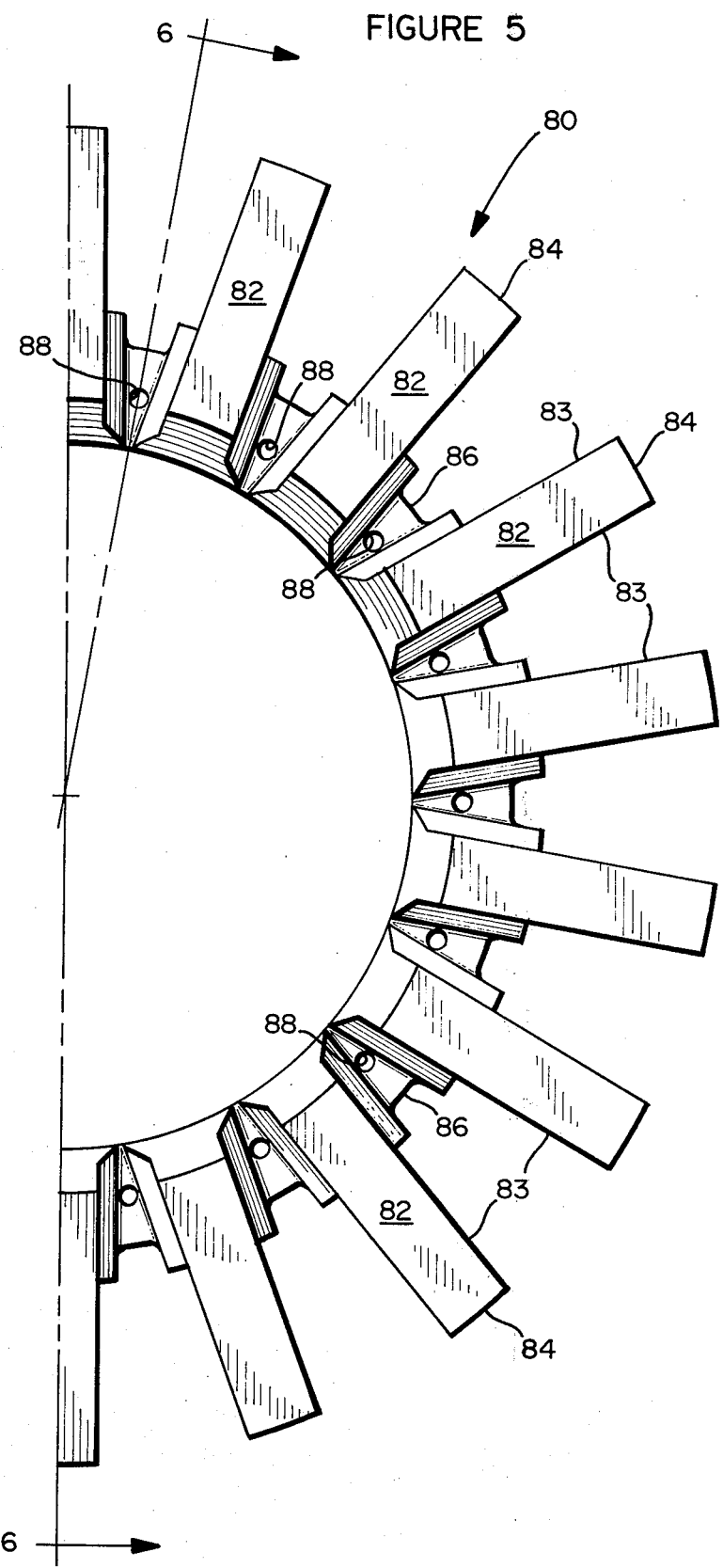

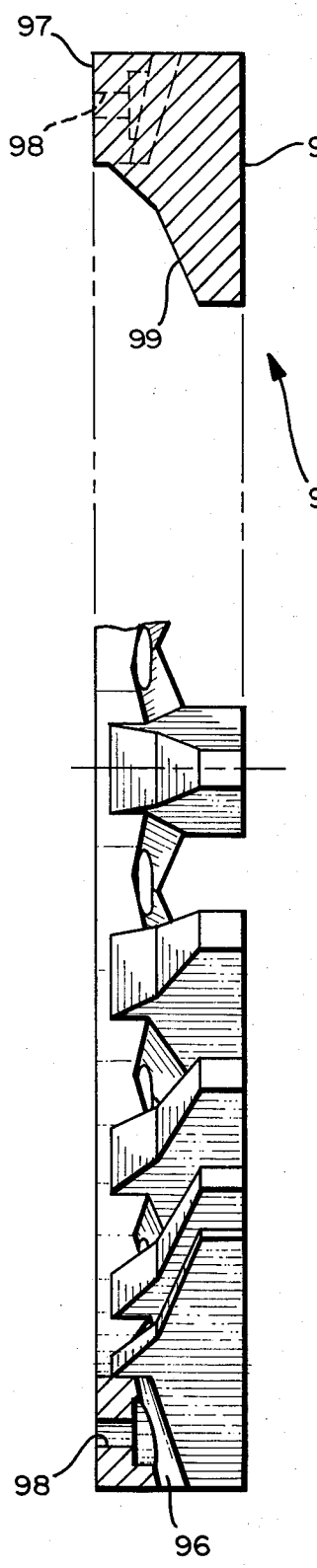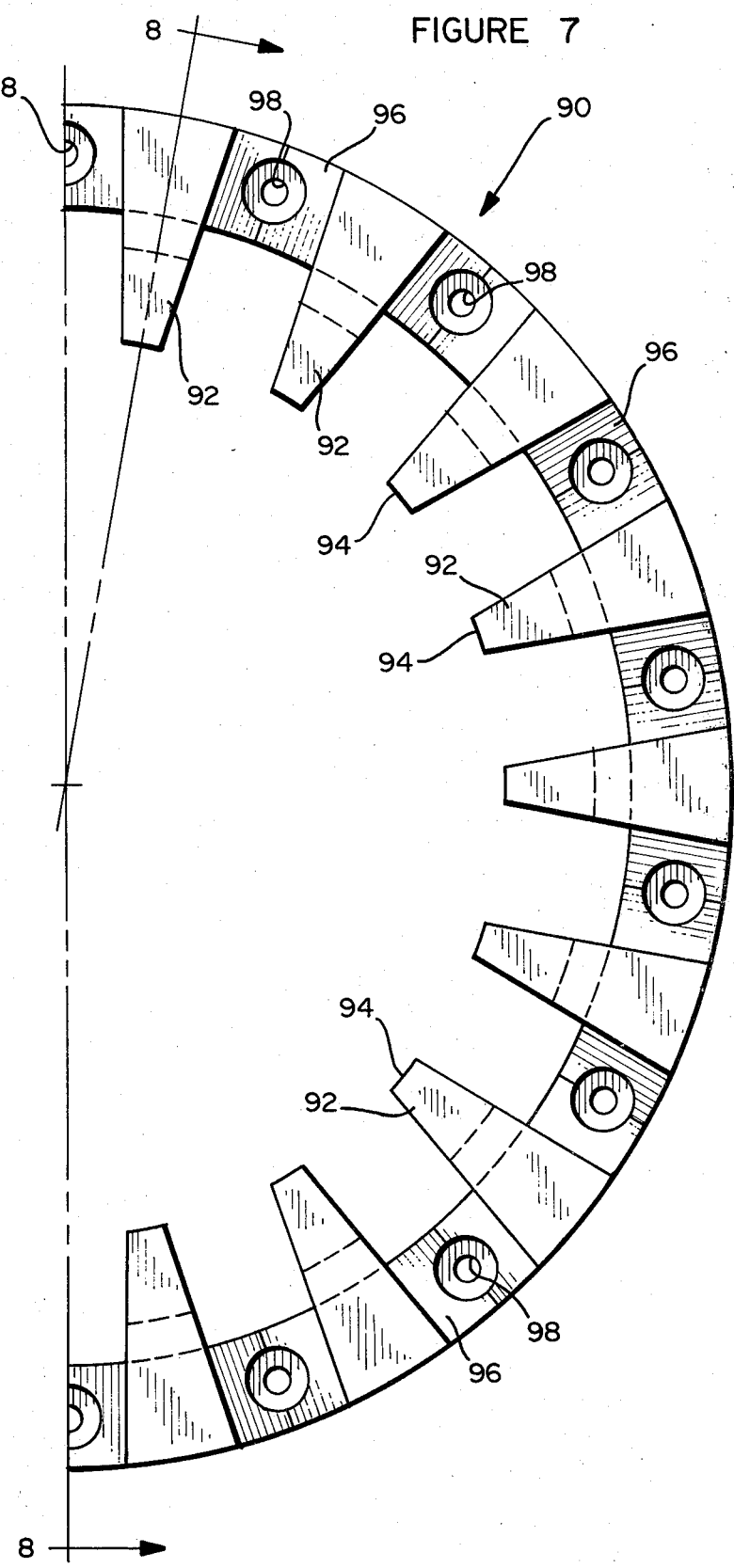

EDDY CURRENT BRAKE

BACKGROUND OF INVENTION

This invention relates to eddy current brakes, and particularly to those which are used in the field of well drilling.

The use of the electrical eddy current brake as an auxiliary braking unit has come into general use by well drillers within the last twenty-five years. Such units are superior to water brake devices in that they provide high braking torque at rotational speeds and have no drag when not in operation. The eddy current brake units employed have been principally of the drum type which are directly attached to drill string drawworks. The rotor consists of an outer rotatable drum disposed about internal electromagnetic DC coils. The amount of torque produced depends upon the rotational speed of the drum and the magnetic flux density, and the electrical resistivity of the drum material in which eddy currents are induced. The descent of the drill string in the well is retarded by the resistance to rotation of the drum of the eddy current brake. The retarding force depends upon the speed of rotation of the drum and the strength of the magnetic field induced in the drum. The strength of the magnetic field is varied by a DC power supply which is controlled by the operator.

These units can handle a maximum retarding torque of approximately one hundred and fifty thousand foot pounds in the larger units. The size of such units is approximately six and one-half feet high and five feet in width.

In the course of the operation of these units a large amount of heat is generated. To preserve operable stability of the eddy current brake, it is necessary to carry off the heat generated during operation by passing cooling fluid through the unit. Water is generally used as the cooling liquid, and can be supplied at the rate of approximately one hundred and fifty gallons per minute for the larger type of eddy current units. Such water should be of low mineral content and of sufficient quantity and of low temperature to adequately carry off the heat generated.

Smaller sized units have been developed which would handle a maximum torque of approximately twenty thousand foot pounds. There are generally three to four different sizes of units offered by manufacturers for use. There is a need for a smaller more compact auxiliary braking unit which will have relatively high braking torque and will be more thermally efficiently cooled than the drum-type eddy current units now in general use.

SUMMARY AND FEATURES OF INVENTION

Accordingly, this invention contemplates a new type of eddy current brake which will provide a substantial improvement in capacity, reduction of size, and lower cost and maintenance than the eddy current type of units presently being used. This invention is directed to a new and compact type of eddy current brake unit.

It is a feature of this invention to provide a new type of eddy current brake for well drilling operations.

Another feature of this invention is to provide a rotor disc-type eddy current brake for use in the well drilling field.

A still further feature of this invention is to provide an eddy current brake which can be economically produced and maintained.

Another feature of this invention is to provide an eddy current brake which has greater magnetic effectiveness than previous types of units.

It is another feature of this invention to provide an eddy current brake which can readily be assembled and disassembled.

Another feature of this invention is the provision of an eddy current brake which can be more effectively cooled.

It is a still further feature of this invention to provide an eddy current brake which has a very effective pole arrangement for providing enhanced magnetic capability.

It is a still further feature of this invention to provide a rotor, coil, and pole arrangement giving a more uniform and efficient path for the magnetic lines of flux generated by the coil.

It is also a feature of this invention to provide an eddy current brake device which has a very high capacity per unit size.

A further feature of this invention is to provide the ability to readily and accurately adjust the gap between the pole faces and corresponding rotor faces.

It is another feature of this invention to provide the capability of handling substantially greater loads by permitting operation of multiple units in tandem connection to the load.

These and further features of this invention will become apparent from the following description of the drawings.

DESCRIPTION OF THE DRAWINGS

FIG. 5 is a plan view of half of the inner circular pole ring.

FIG. 6 is a sectional view along line 6—6 of FIG. 5.

FIG. 7 is a plan view of a half of the outer circular pole ring.

FIG. 8 is a sectional view along line 8—8 of FIG. 7.

DESCRIPTION OF THE INVENTION

Figure 1:
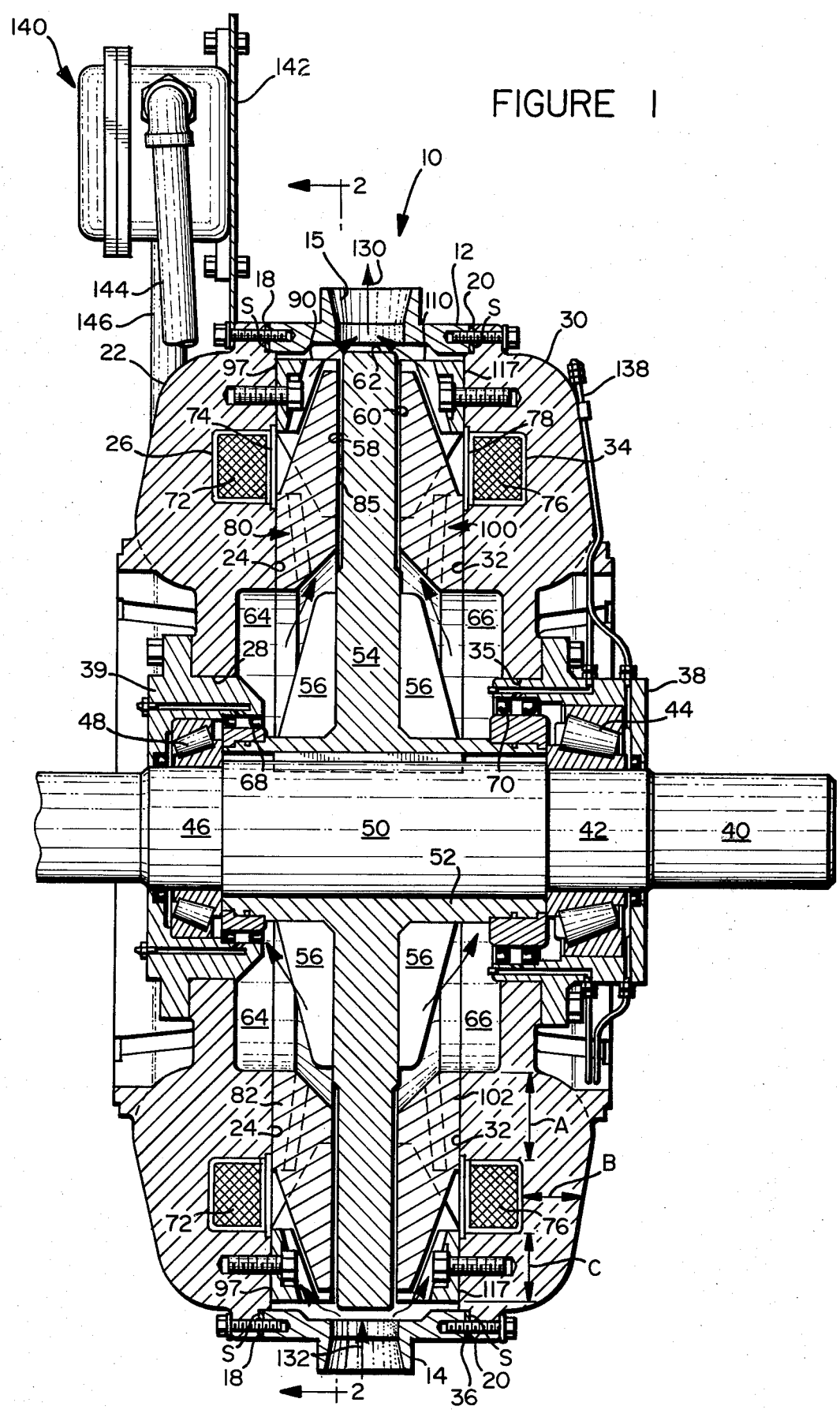
FIG. 1 is a cross-sectional view of the eddy current disc-type rotor device of the instant invention.

Referring particularly to the drawings, FIG. 1 discloses a half section view of the the disc-type rotor eddy current brake of the subject invention which is generally indicated by 10.

The outer housing consists of a central annular ring 12 which has a coolant inlet 14 at the bottom thereof and a coolant outlet 15 at the top. Each side of the housing has an inlet 16 also (FIG. 2) which is normally plugged. Its left side edge 18 and its right side edge 20 provide an accurate support and mount receiving section. They each have a plurality of circularly arranged threaded holes for receiving assembly screws.

Disposed along the left side of the ring 12 and mounted on the side edge mounting section 18, is a left end cap member 22 which closes and provides the left side cover for the housing. This end cap member 22 supports the internal eddy current components for that side of the unit. It has a flat interior annular support surface 24. Not shown, but hereinafter discussed, are two radially spaced circularly disposed sets of mounting screw holes in surface 24. In between these two spaced rows of annular threaded mounting screw receiving holes is an annular coil receiving cavity 16 into which one of the two annular magnetic coils of the unit are received. The end cap piece 22 has a central circular opening 28 for receiving a bearing and a seal assembly 39.

The right side of the housing has a right end cap member 30 which has the same shape and general function as left end cap member 22. It closes the right side of the housing and has the same functions as the left end cap member 22. The flat annular inner support face 32 also has two spaced circular rows of threaded mounting screw-receiving holes. Disposed between the two circles of threaded holes is the annular coil receiving cavity 34 for the circular magnetic coil. The outer peripheral section 36 of end cap 30 faces the annular right side edge 20 of central annular ring 12 and bears against annular shim S. The right end cap 30 has a central opening 35 for receiving a bearing and seal assembly 38 which is bolted to the end cap 30 adjacent the opening 35. A second bearing and seal assembly 39 is fastened within the opening 28 of the left end cap 22 and held in position by machine screw which are threaded into the end cap member 22 adjacent the opening 28.

Input shaft end 40 has a stepped section 42 on which bearing 44 of the bearing assembly 38 is mounted. The rear end step section 46 of the shaft is supported by bearing 48 of bearing and seal assembly 39. The central section 50 of the shaft is disposed within the housing between bearings 44 and 48 and has a key-way shown in dotted outline on which the hub 52 of the rotor 54 is mounted.

With respect to shaft end 46, it should be noted that it extends through the bearing assembly 39. The extended shaft makes it possible to put several machines in tandem by connecting shaft end 46 to another eddy current brake unit. This permits several units to be connected in tandem, thereby accommodating a load greater than the capacity of a single unit.

The rotor 54 is a circular disc-shaped member integrally connected to the hub 52 and is oriented along the center line and longitudinal axis of the housing. It has a plurality of spaced vanes 56 which support the disc in a rigid perpendicular position to the hub and the transverse axis of the housing on which the shaft 40 is positioned.

The rotor is constructed of magnetic material inasmuch as it provides a path for magnetic lines of flux. It has a flat left side surface 58 and a right flat annular side face 60. Both of these faces extend from the circular periphery 62 of the rotor 54 to a point approximately half the radial distance toward the center of the hub.

Within the housing adjacent the rotor vanes 56 there are open annular cavities formed by annular recess 65 in the left cap member 22 and by an annular recess 66 in right end cap 30. Coolant fluid is circulated through the annular area 60 and 58 into the recess areas of 64 and 66. Coolant also proceeds between the interdigitated pole faces. A seal member 68 is disposed on the hub 52 adjacent to bearing 48 on the left side of the housing. On the right side of the housing the seal assembly 70 is positioned within the bearing and seal assembly 38.

A circular electromagnetic coil 72 is mounted within the annular cavity 26 to provide the magnetic lines of flux for the pole assemblies on the left side of the rotor. It is closed within the cavity by an annular non-magnetic plate 74. The electromaganetic source for the right side of the housing is a circular coil 76 similar to coil 72. It is received within the cavity 34, and is covered by an annular non-magnetic plate 78, which closes cavity 34 over the coil 76.

The coils provide the electromagnetic source of flux for the eddy current magnetic circuit. Immediately adjacent to the coils and mounted on the end caps between the coil and the rotor are two sets of magnetic pole rings. An inner pole ring of one polarity and an outer pole ring having the opposite polarity are mounted on the end caps immediately adjacent each side face of the rotor.

Figure 2:
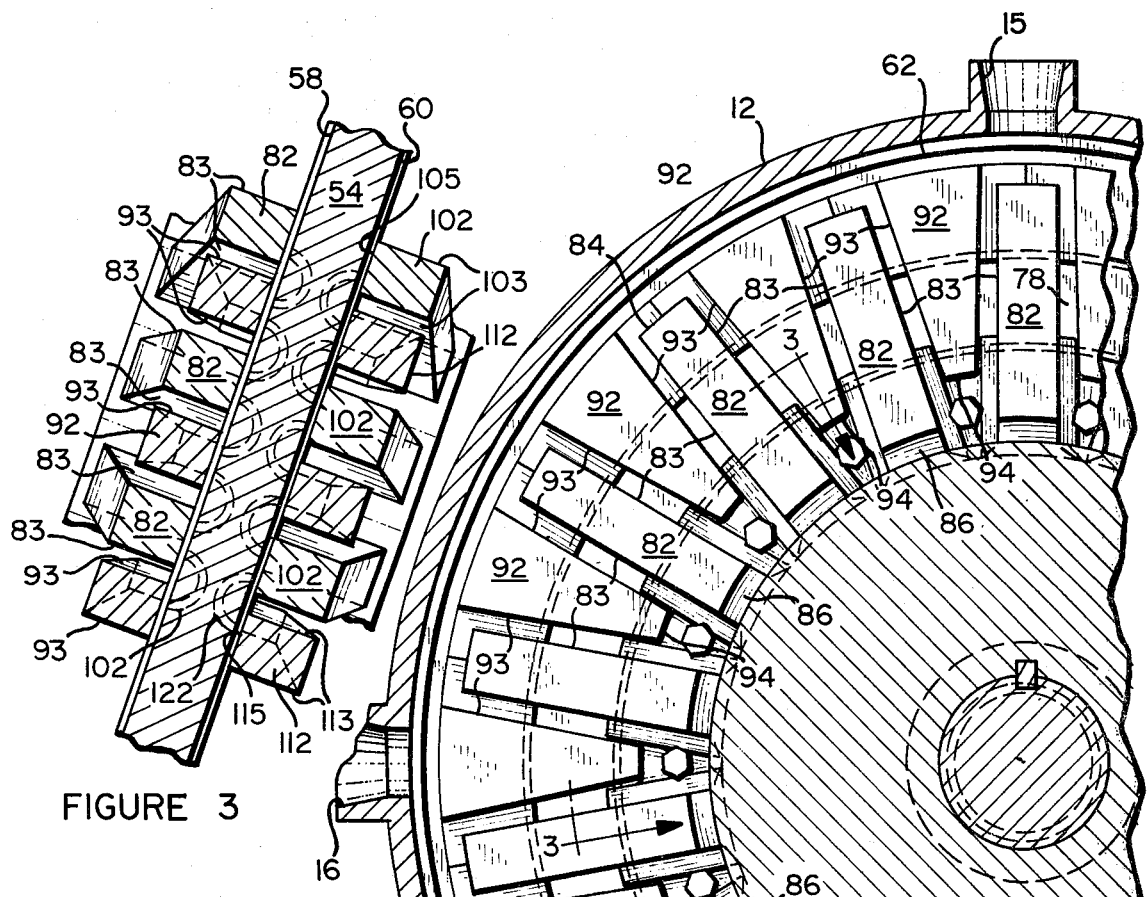
FIG. 2 is a sectional view along line 2—2 of FIG. 1 showing the arrangement of the poles on one side of FIG. 1 showing the arrangement of the poles on one side of the rotor.

The arrangement for these pole rings for the left side of the housing can be seen with reference to FIGS. 5, 1 and 2. The left inner pole ring 80 has a spaced series of circularly-disposed outwardly-radiating inner poles 82 which have sides 83 and an outer peripheral tip 84. Each pole 82 has a flat pole face 85 disposed parallel and close to the annular flat surface 58 of the rotor, with a small air gap therebetween. The poles 82 are all connected together along an inner annular pole supporting ring 86 which has a flat inner mounting surface 87 which is mounted directly on the flat cap member surface 24. The supporting ring is fastened to the end cap surface 24 by machine screws through holes 88. These holes extend through the ring and into the threaded holes of the inner circle of screw-receiving holes on left end cap member surface 24.

The left outer pole ring 90 is similarly mounted on the end cap 22 on the outer section of flat circular mounting surface 24 as shown near the top of the sectional view of FIG. 2 where the machine screw holds the flat ring engaging support surface 97 against the outer portion of the flat support surface 24.

Referring to FIG. 2, it will be seen that the oppositely radially extending poles 82 and 92 of the inner and outer rings are interfitted between each other and their faces spaced from each other. The inner ring is supported on the left end cap member 22 along the inner flat face 24 by the machine screws mounted in the circular holes of surface 24.

The outer pole ring 90 has its connecting ring inner face 97 flushly mounted against the surface 24 and held in position by the machine screws extending through the holes 98 in the outer ring. The structure can be seen with reference to FIGS. 7 and 8 which show the construction of the outer ring.

It should be noted that in FIG. 2 that the side faces of the poles are substantially spaced apart so that the magnetic lines of flux flow outwardly from the base of the poles to their tips and then in a direction toward the pole face and across the gap to the adjacent rotor face. The cross section of each pole is designed to provide a more uniform and efficient path for the magnetic lines of flux which are generated by the coil and pass out the pole faces. Note in the lower portion of FIG. 1 that the cross-sectional dimensions A, B, and C within the end cap 30 are substantially equal.

Figure 3:
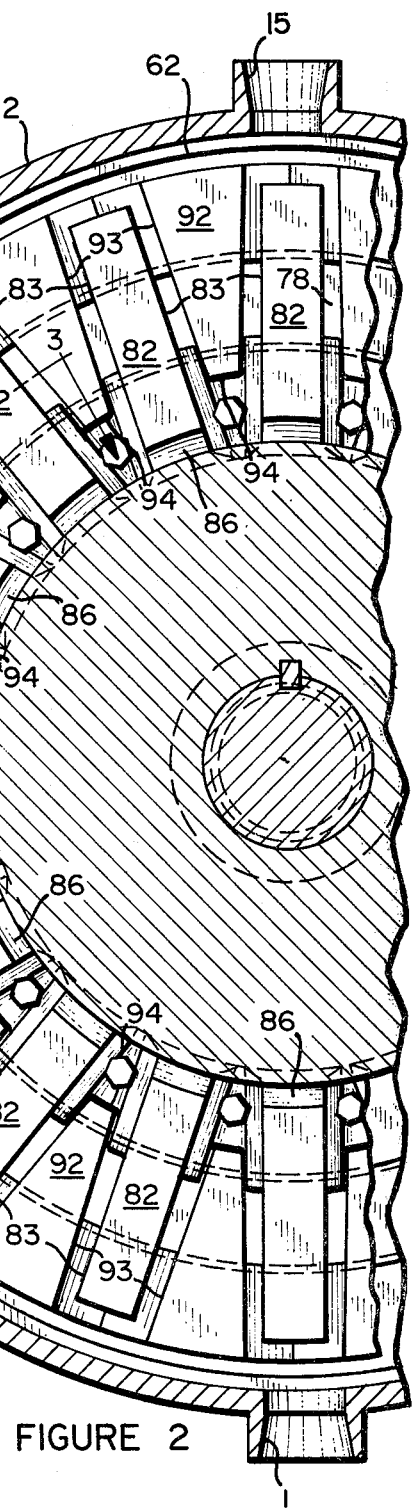
FIG. 3 is a partial sectional view along arc 3—3 of FIG. 2 showing the flux path and relative arrangement of the pole faces along the outer periphery of the rotor adjacent both rotor faces.

The spacing of the poles with respect to each other and to the rotor, and the flux lines produced in the rotor are shown in FIG. 3. The flux lines flow from the base of the poles upwardly and simultaneously outwardly to the the pole face and into the rotor itself where they then travel laterally to the adjacent pole. The unit can have either twelve or eighteen pole faces.

Figure 4:
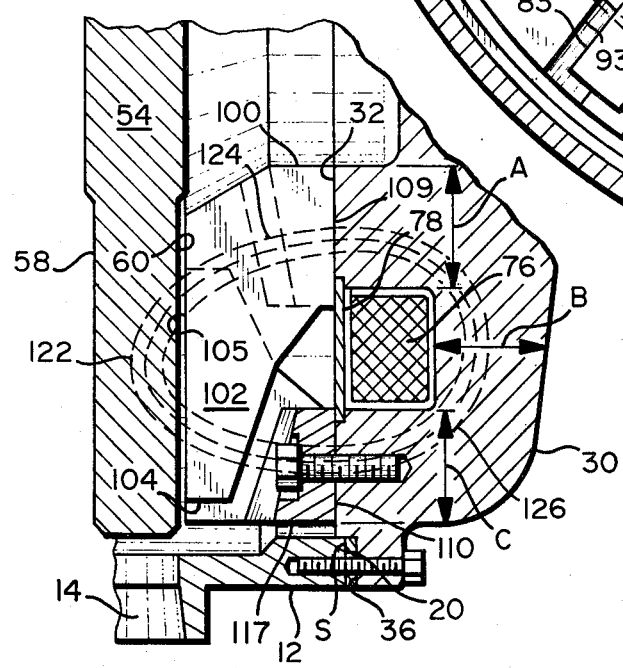
FIG. 4 is an enlarged partial view of FIG. 1 showing the flux lines and flux path for a pair of poles adjacent the rotor.

FIG. 4 is an enlarged portion of the right lower end cap section of FIG. 2 illustrating the path of travel of flux lines along the pole. The right inner pole ring 100 and the right outer pole ring 110 are shown. The right inner pole ring 100 is identical in construction to the left inner pole ring 80 and the right outer pole ring 110 is identical in construction to the left outer pole ring 90. The right inner pole ring 100 as indicated in FIG. 3 and FIG. 4 includes radially outwardly extending poles 102 which have a tip 104. The pole faces 105 are disposed close to the rotor inner flat surface 60. The ring is held along its inner mounting surface 109 to the mounting surface 32 of the right end cap 30. It is held in position on the cap by machine mounting screws in the same fashion as the rings are held on the left end cap member.

The right outer pole ring 110 has poles 112 having a tip 114 and side faces 113. It will be noted in referring to FIG. 3 that the spacing between the pole faces 103 and 113 of the pole rings is sufficiently spaced to direct the flux lines into the rotor and through the rotor rather than across from one pole side face to another. Preferably, the distance between adjacent pole faces and the rings is approximately ten times that of the gap between the pole faces and the side face of the rotor.

The path of travel of the lines of flux from the magnet 76 and through the poles and rotor is shown in FIGS. 3 and 4. It is a continuous path of substantially even cross section through all of the elements, providing a smooth uninterrupted flow for the magnetic lines of flux. Note that the dimensions A, B, and C are equal. Tracing the flow from the portion of travel shown in FIG. 3 at 122, the lines of flux travel across the gap to face 105 of pole 102 and down through the pole as indicated at 124 and across supporting faces 109 and 32 to the right end cap and around the coil 76. The lines of flux leave the lower end of the coil 126, traveling through the casting and through the outer pole ring 110 to the pole 112 and pole face 115 across the gap and into rotor to complete the travel for the pair of adjacent poles.

It is possible to make small dimensional changes in the internal gap between the rotor faces 58 and 60 and the adjacent pole faces. It will be observed that the rotor 54 is mounted on the centrally extending shaft 50, and that the shaft is supported by bearing assemblies 38 and 39 respectively supported in end cap members 30 and 22. The end cap members each support a set of interdigitated pole faces and are in turn mounted on a central annular ring 12. As can be seen in FIG. 1, when the end cap members 22 and 30 are moved outwardly, the gap between pole faces and the adjacent rotor surface will increase. This is accomplished by the use of thin, annular shim members S which are placed adjacent to the left side edge 18 and the right side edge 20 of the central annular ring 12. The inlet and outlet openings 14, 15, and 16 are sufficiently wide to permit the insertion of feeler gauges into the gap between the pole faces and the adjacent rotor face to measure the clearance or gap at the point in the closed housing.

An important aspect of the operation of the unit in addition to the flux path and pole arrangement, is the cooling of the unit. Referring to FIG. 2, coolant, usually water, which has low temperature and negligible mineral content, is introduced to the inlet 14 and flows through the internal part of the cavity behind the pole faces and into the central cavity adjacent the rotor hub. The spacing between the poles and their taper on the rearward surfaces permits the water to readily move along the poles and up through the central portion of the housing adjacent the hub. The small area adjacent the periphery 62 of the rotor also permits the water to flow through the housing so that the entire upper and lower portions of the rotor and pole assembly have coolant fluid. The path of coolant flow as indicated by the arrows 130, and 132 is from inlet 14 through the housing and then out through the outlet 15. Bearing lubricant to the bearing 44 is supplied along line 138.

The electrical junction box 140 is mounted on the bracket 142 and has electrical conduit lines 144 and 146 connected to the housing to carry the DC electrical current to the coils 72 and 76. The path for the electrical connections through left end cap 22 and right end cap 30 of the coil cavities are not shown.

Accordingly, this invention provides an eddy current brake in which a new arrangement of rotor and poles is used such that the flux path may pass directly through the rotor or pass along one side surface thereof and between adjacent poles which are of opposite polarity. The flux path through the poles and the supporting section is substantially uniform to avoid constriction of the flux path at any given point. Consequently, there is greater magnetic effectiveness and greater load capacity of the unit.

The integral pole ring construction permits the poles of a given polarity to be simultaneously cast and accurately machined, and then readily mounted in the unit with a fixed spacing between them. The end cap planar mounting surface provides an accurate support surface for simultaneous positioning of all of the poles. Thus it is possible to quickly and accurately assemble the sets of poles with respect to each other and to the rotor.

With respect to adjustment of the pole faces, and the rotor, the adjustment of the gap is accurately and quickly made by the use of the annular gasket-like shims S. The use of one or more of such shims will adjust the gap between the rotor face and the pole faces uniformly and simultaneously. The inspection-fluid ports 14, 15 and 16 permit the feeler gauge to be inserted within the closed housing and into the gap between the rotor surface and pole face to obtain a gap measurement. Additional ports or feeler gauge openings, not shown, provide for four quadrant measurement along the housing periphery.

The shaft, which extends through both sides of the housing, permits tandem operation of the units for those loads that would exceed the rating for a single unit.

The provision for coolant flow from the bottom to the top of the housing with flow along the rotor and between and over the poles provides enhanced cooling capability for the unit.

While this invention has been described, it will be understood that it is capable of further modification, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What I claim is:

1. An eddy current brake, comprising:

(a) a closed hollow housing which is relatively thin along its transverse axis and has a generally circular shape along its longitudinal axis and including a relatively flat disc-shaped end cap member constituting each side thereof, (b) a disc-shaped rotor centrally disposed within the housing and having two flat annular side faces adjacent the periphery thereof and which is mounted on a shaft extending transversely thereto and along the transverse central axis of the housing, (c) a magnetic pole assembly including a set of interdigitated spaced circularly arranged poles which are disposed within the housing and in the same plane on each side of the rotor adjacent each flat annular side face adjacent the periphery thereof, each adjacent pole being of opposite polarity, (d) a circular magnetic coil supported within the housing on each end cap member immediately adjacent each set of spaced circularly arranged poles and in connection therewith through a metal connecting flux path in the end cap member, and (e) the housing having means for permitting coolant fluid flow into the housing at the periphery of the rotor and through the housing to remove generated heat.

2. The eddy current brake as set forth in claim 1, wherein:

(a) the magnetic poles provide a radially extending flux path between the magnetic coil and the rotor with a long large area pole face disposed immediately adjacent and slightly spaced from the rotor side face.

3. The eddy current brake as set forth in claim 1, wherein:

(a) the magnetic poles and the metal connecting path adjacent the coil provide a substantially uniform cross-sectional flux path for the magnetic lines of force.

4. The eddy current brake as set forth in claim 1, wherein:

(a) the magnetic poles are elongated tapered relatively thick metal members which have flat pole faces slightly spaced from the flat annular side face of the rotor to provide a small air gap across which magnetic lines of flux pass, and (b) the magnetic poles of one polarity extend radially in one direction and those opposite polarity extend radially in the opposite direction.

5. The eddy current brake as set forth in claim 1 or 4, wherein:

(a) the magnetic poles of each polarity of the set of poles is part of a unitary ring of radially extending poles mounted on the housing.

6. The eddy current brake as set forth in claim 4, wherein:

(a) the sides of the adjacent poles are uniformly spaced from each other and are disposed at a distance which is at least several times greater than the gap between the pole faces and the rotor annular side face.

7. The eddy current brake as set forth in claim 4, wherein:

(a) the coil is disposed in the end cap member in a recess immediately adjacent the inner edge of the contiguous pole members of the ring to minimize length of flux path.

8. An eddy current brake, comprising:

(a) a hollow housing which is relatively thin along its transverse axis and has a generally circular shape along its longitudinal axis with relatively flat circular end cap sides which are fastened thereto to permit axial movement thereof, (b) a disc-shaped rotor having two flat annular side faces adjacent the periphery thereof and which is mounted on a shaft extending transversely thereto and is disposed along the transverse axis of the housing, (c) an inner concentric circular pole ring disposed on each side of the rotor and fastened to the adjacent end cap sides of the housing, (d) the pole rings having a plurality of spaced poles which extend radially outward and have faces disposed adjacent the annular rotor flat side face, (e) an outer concentric circular pole ring disposed on each side of the rotor which is fastened to the adjacent end cap sides of the housing, (f) the poles of the inner and outer pole rings being spaced such that the poles of one ring project into and between two adjacent poles of the other ring, and (g) a circular magnetic coil disposed adjacent each of the pole rings and having a magnetic path to the faces of such poles in each of the rings.

9. The eddy current brake as set forth in claim 8, wherein:

(a) the poles and housing are arranged and shaped to provide internal fluid flow paths for cooling fluid.

10. The eddy current brake as set forth in claim 8, wherein:

(a) the housing includes a central annular ring and two end cap substantially circular end members, and (b) the inner and outer pole rings associated with each end cap member are removably fastened thereto.

11. The eddy current brake as set forth in claim 8, wherein:

(a) the housing provides means for varying the air gap between the faces of the poles and the adjacent rotor side face.

12. The eddy current brake as set forth in claim 8, wherein:

(a) the housing includes circumferentially arranged openings which permit insertion of a feeler gauge into the air gap between the pole faces and the adjacent rotor side face to measure the air gap.

13. The eddy current brake as set forth in claim 8 or 12, wherein:

(a) the rotor is mounted on a shaft which extends through both sides of the housing to permit connection of the unit to a second eddy current brake unit.

* * * * *